A. E. Lyman,
Transplanter.
No. 92,198.          Patented July 6, 1869.
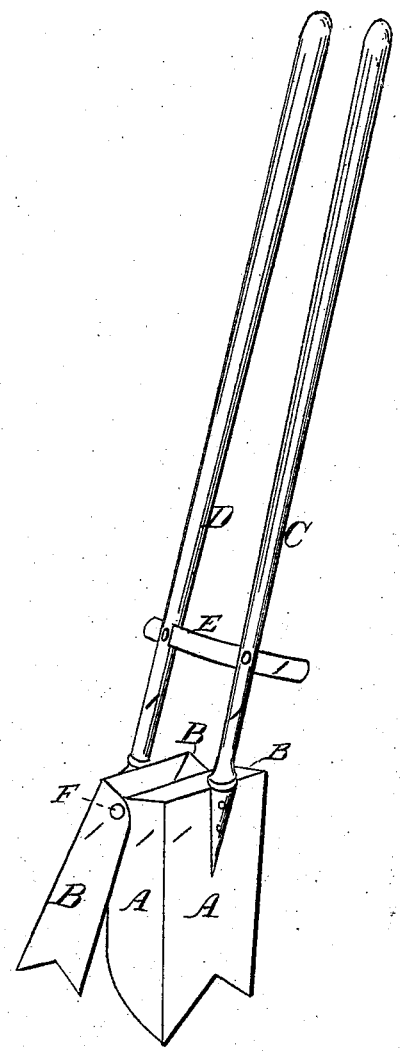
WITNESSES
C. B. Pollard
W. N. Ratner
A. E. Lyman
Alfred E. Lyman
Inventor

United States Patent Office.

ALFRED E. LYMAN, OF NORTHAMPTON, MASSACHUSETTS.

Letters Patent No. 92,198, dated July 6, 1869.

---

IMPROVEMENT IN TRANSPLANTING AND WEEDING-MACHINE.

---

The Schedule referred to in these Letters Patent and making part of the same.

---

Be it known that I, ALFRED E. LYMAN, of Northampton, in the county of Hampshire, and State of Massachusetts, have invented a new and useful improved Transplanting and Weeding-Machine; and I do hereby declare the following to be a full, clear, and exact description of the construction and operation of the same, reference being had to the annexed drawings, making part of this specification, in which—

Figure 1 is a perspective view of the several parts, representing the machine ready for use, the necessary remaining references being had by letters, as follows, as seen in the drawings:

A, a longitudinal elevation.
B, a transverse section.
C, a handle for inside section.
D, a handle for outside section.
E, a guide for holding same in place.
F, rivets (or hinge) or bolts.

I construct A of one piece of suitable metal, (iron or steel,) by turning at right angles. I form the part A, making three sides to the same, of a suitable size to press closely inside of B, which is also formed and constructed in the same manner as A.

Each, when so constructed, with lowest angular edges made sharp, and riveted or bolted together, as seen in A and B, form the parts entering the earth. A being longest, enters the earth first, the points cutting angular or shearing, thereby causing much greater ease and rapidity in taking up plants or weeds.

I construct my handles, C, in the usual manner, of any desired length, and required style and dimensions (usually, however, about two or two and a half feet in length,) to make it easy to operate, the handles C being fastened to a shank similar to a trowel-shank, and riveted or fastened to each, A and B, as seen in the drawings.

I construct guide E of suitable metal, and fasten the end loosely in handle D, giving the same sufficient room to adjust the stay or guide to any desirable distance or position, and fasten the same by a set-screw.

The guide E, I use only when desired. As the side or angle of B, I make in such a manner, and of suitable material, as to form a spring, forcing itself closely up to A, so firmly as to hold A in any desired position.

Should any additional assistance be found necessary, I then use guide E, as aforesaid.

I construct F of metal bolts or rivets, of sufficient length to hold firmly both A and B, giving freedom for any sized plant, without hurtful obstructions in the inside of A and B, always adapting the size of the machine for the purposes designated.

For weeding-purposes, I use much smaller machines, as weeds are intended to be destroyed.

By constructing, as above written, I can not only take up the plants with sufficient earth to make them quite sure to live, but also I can, with the same machine, and at the same time, form a suitable receptacle for depositing the plant in the same, always retaining a quantity of earth sufficient to make it doubly sure that the said plant will live, if transplanted with my improved invention, as above described and substantially set forth.

What I claim as my invention and improvement, is—

The three-side angular pieces A and B, with edges on the sides, shutting within each other so closely as to retain itself in any desired position, the same being held firmly by suitable bolts (or rivets) of any required length best adapted therefor, the stay E to be only at the option of the operator, (used when desired,) the handles C D being operated at will, adjusting the parts A and B as they turn on the axle or hinge F, so as to produce the intended effect.

ALFRED E. LYMAN.

Witnesses:
C. B. POLLARD,
W. N. PLATNER.